United States Patent
Mori et al.

(10) Patent No.: US 9,998,996 B2
(45) Date of Patent: Jun. 12, 2018

(54) VEHICLE COMMUNICATION SYSTEM

(71) Applicant: HONDA MOTOR CO., LTD., Tokyo (JP)

(72) Inventors: Takashi Mori, Wako (JP); Motohisa Hirose, Wako (JP); Katsuyasu Yamane, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 14/958,014

(22) Filed: Dec. 3, 2015

(65) Prior Publication Data
US 2016/0165542 A1 Jun. 9, 2016

(30) Foreign Application Priority Data
Dec. 4, 2014 (JP) .................................. 2014-245881

(51) Int. Cl.
*H04W 52/02* (2009.01)
*H04W 4/00* (2018.01)
*H04W 76/02* (2009.01)

(52) U.S. Cl.
CPC ....... *H04W 52/0235* (2013.01); *H04W 4/008* (2013.01); *H04W 76/02* (2013.01);
(Continued)

(58) Field of Classification Search
CPC .............. H04W 76/021; H04W 4/008; H04W 52/0235; H04W 76/02; Y02B 60/50; Y02D 70/144; Y02D 70/142; Y02D 70/00
See application file for complete search history.

(56) References Cited

U.S. PATENT DOCUMENTS

2003/0050104 A1 3/2003 Matsumura et al.
2015/0230285 A1* 8/2015 Park .................... H04W 76/028
455/41.2

FOREIGN PATENT DOCUMENTS

JP 2002-152309 A 5/2002
JP 2003-87172 A 3/2003
(Continued)

OTHER PUBLICATIONS

Kun et al., "Design of Vehicle Control System Based on Bluetooth Low Energy Smartphone Platform" Oct. 26-29, 2013.*
(Continued)

*Primary Examiner* — Ian N Moore
*Assistant Examiner* — Justin T Van Roie
(74) *Attorney, Agent, or Firm* — Westerman, Hattori, Daniels & Adrian, LLP

(57) ABSTRACT

A vehicle communication system includes a mobile terminal having a display screen in which display ON and OFF of the display screen can be operated by a user and a vehicle that performs communication with the mobile terminal in a first interval period when a connection has been established. The vehicle has an in-vehicle control unit that, before the connection is established, sends an inquiry signal for establishing the connection to a vicinity of the vehicle in a second interval period. The mobile terminal has a control section that, before the connection is established, performs scanning operation that enables the inquiry signal to be received in a third interval period. The control section can set the third interval period so as to be operational in at least two periods and sets the third interval period to the high-speed mode when the display of the display screen is on.

17 Claims, 4 Drawing Sheets

(52) U.S. Cl.
CPC ............ *Y02D 70/00* (2018.01); *Y02D 70/142* (2018.01); *Y02D 70/144* (2018.01)

(56) References Cited

FOREIGN PATENT DOCUMENTS

| | | |
|---|---|---|
| JP | 2003-318807 A | 11/2003 |
| JP | 2005-110050 A | 4/2005 |
| JP | 2005-268933 A | 9/2005 |
| JP | 2008-311919 A | 12/2008 |
| JP | 2010-28602 A | 2/2010 |
| JP | 2011-109454 A | 6/2011 |
| JP | 2014-69598 A | 4/2014 |

OTHER PUBLICATIONS

Office Action dated Oct. 4, 2016, issued in counterpart Japanese Patent Application No. 2014-245881, with English translation, (9 pages).

\* cited by examiner

VEHICLE COMMUNICATION SYSTEM

CROSS REFERENCES TO RELATED APPLICATIONS

The present application claims priority under 35 U.S.C. § 119 to Japanese Patent Application No. 2014-245881, filed Dec. 4, 2014, entitled "Vehicle Communication System." The contents of this application are incorporated herein by reference in their entirety.

BACKGROUND

1. Field

The present disclosure relates to a vehicle communication system.

2. Description of the Related Art

An in-vehicle equipment remote control system has been known which conducts direct communication between a vehicle and a smartphone or other mobile communication equipment and executes the mobile communication equipment's application program, thereby displaying a vehicle status and performing vehicle remote control (for example, Japanese Unexamined Patent Application Publication No. 2014-69598). In addition, an information communication device has been known which, when performing intermittent radio communication with another device, determines a radio communication suspension period (intermittent period) in accordance with remaining battery level, noise level, ambient temperature, and the like (for example, Japanese Unexamined Patent Application Publication No. 2003-87172).

The remote control system described above, however, is premised on the use of, for example, Wi-Fi (registered trademark), Bluetooth (registered trademark), or other communications standards, raising concerns about complicated procedures associated with the establishment of connection between a vehicle and a mobile communication device. Such complicated procedures for communication between a vehicle and a communication device may cause a problem of increased electric power consumption in communication. In addition, the information-communication device described above reduces power consumption in radio communication in accordance with remaining battery level and environmental information, which does not always control a communication period in a proper manner in response to users' intentions and service condition and therefore may impair convenience for users.

SUMMARY

The present application describes a vehicle communication system that is capable of reducing electric power consumption in radio communication without impairing convenience for users.

A first aspect of the present application provides a vehicle communication system which includes a mobile terminal (for example, mobile terminal 11 in an embodiment) having a display screen in which display ON and OFF of the display screen can be operated by a terminal controller of the mobile terminal and/or a user and a vehicle (for example, vehicle 12 in the embodiment) that performs mutual telecommunication with the mobile terminal (which is also referred to as "the communication" in this application) in a first periodic interval of time when a connection with the mobile terminal has been established, in which the vehicle has an in-vehicle control unit (for example, integrated control unit 46 in the embodiment) that, before the connection with the mobile terminal is established, sends an inquiry signal for establishing the connection to a vicinity of the vehicle at a second periodic interval of time, in which the mobile terminal has a control section as the terminal controller (for example, control section 24) that, before the connection with the vehicle is established, performs scanning operation that enables the inquiry signal to be received at a third periodic interval of time, and in which the control section can set the third periodic interval of time so as to be operational in at least two periods of a low-speed mode (with a first period) and a high-speed mode (with a second period shorter period than the first period of the low-speed mode) and sets the third periodic interval of time to the high-speed mode when the display of the display screen is on. With this arrangement, the scanning period of the mobile terminal, before the connection is established, is set to the high-speed mode if the user is determined to be likely to view the display screen of the mobile terminal 11. Consequently, the connection can be established in a short time even if an inquiry signal is received intermittently, while wasted electric consumption of the mobile terminal is reduced.

A second aspect of the present application provides a vehicle communication system of the first aspect, in which the mobile terminal may have a program stored therein that displays in the display screen an operation screen for displaying a status of the vehicle or operating a function of the vehicle (i.e., the display operation for vehicle-related information or functions), in which display ON and OFF of the display screen may be display and non-display, respectively, of a predetermined screen related to execution of the program, and in which, when displaying a predetermined screen related to execution of the program, the control section may set the third periodic interval of time to the high-speed mode. Since the scanning period is set according to whether or not the predetermined program related to the vehicle is activated, the scanning period can be set to the high-speed mode on a more timely basis, except the case where the display of the display screen is on for other purposes.

A third aspect of the present application provides a vehicle communication system of the first aspect, in which display ON and OFF of the display screen may be activation and deactivation, respectively, of a backlight provided in the display screen, and in which the control section may set the third periodic interval of time to the high-speed mode when the backlight is activated. Since the scanning period is set according to whether or not the backlight is activated, the scanning period can be changed sooner, thereby enabling the connection with the vehicle to be established sooner.

A fourth aspect of the present application provides a vehicle communication system of the second aspect, in which the control section may set the third periodic interval of time to the low-speed mode when a predetermined screen related to execution of the program is in a non-display state and the program is in execution. With this arrangement, the scanning operation is performed in the low-speed mode even if the connection is less likely to immediately become necessary, thereby enabling the connection to be established while wasted electric consumption of the mobile terminal is reduced.

A fifth aspect of the present application provides a vehicle communication system of the second or fourth aspect, in which the control section may suspend the scanning operation when the program is not executed. With this arrangement, if it is determined that the mobile terminal obviously has no intention to communicate with the vehicle, the scanning operation is suspended, thereby preventing wasted electric consumption of the mobile terminal.

A sixth aspect of the present application provides a vehicle communication system of any one of the first to fifth aspects, in which the second periodic interval of time and the third periodic interval of time may be different from each other. With this arrangement, even if no synchronization is established between the mobile terminal and the vehicle, the connection can be automatically established when the second periodic interval of time and the third periodic interval of time coincide with each other in timing.

A seventh aspect of the present application provides a vehicle communication system of the sixth aspect, in which the connection may be an operation for establishing a Piconet complying with the Bluetooth (registered trademark) communications standards. Consequently, reduced electric power consumption as well as quicker establishment of the connection of the mobile terminal can be achieved in an effective manner in a highly general-purpose communication system having a parent-child relationship in communication.

An eighth aspect of the present application provides a vehicle communication system of any one of the first to seventh aspects, in which, after the connection has been established, the control section may maintain the communication between the vehicle and the mobile terminal at the first periodic interval of time regardless of display ON and OFF of the display screen, periodically receive a signal containing status information about the vehicle during the communication, determine based on the status information about the vehicle whether or not a predetermined alighting condition has been met, and, when determining that the alighting condition has been met (i.e., determining that the vehicle is deemed not to be in operation or use by a driver), disconnect the communication with the vehicle after a predetermined time has elapsed since the alighting condition was met. Since, after the connection is established, the communication is maintained as long as the mobile terminal is located within a radio communication range, the communication can be carried out in a rapid manner when a change is made to the vehicle status or when the vehicle is operated via the mobile terminal. In addition, if it is determined that a change in the vehicle status and the vehicle operation via the mobile terminal are less likely to occur, the communication is automatically disconnected, thereby preventing wasted power consumption in periodic communication between the vehicle and the mobile terminal.

A ninth aspect of the present application provides a vehicle communication system of the eighth aspect, in which the predetermined alighting condition may be deemed to be met when the vehicle is powered off or when an in-vehicle communication network that is mounted on the vehicle and monitors the status of the vehicle to send the status information about the vehicle to the mobile terminal goes into a predetermined power-saving mode. Consequently, the necessity for maintaining the connection of communication between the vehicle and the mobile terminal can be determined in a proper fashion.

A tenth aspect of the present application provides a vehicle communication system of any one of the first to seventh aspects, in which, after the connection has been established, the control section may maintain the communication between the vehicle and the mobile terminal at the first periodic interval of time regardless of display ON and OFF of the display screen, in which the in-vehicle control unit may have the in-vehicle communication network that monitors the status of the vehicle to send the status of the vehicle to the mobile terminal as the status information and, after the connection has been established, send to the mobile terminal the status information indicating that the in-vehicle communication network has gone into a predetermined power-saving mode or a request for disconnection of the communication performed at the first periodic interval of time, and in which, upon receiving the status information indicating the predetermined power-saving mode or a request for disconnection of the communication performed at the first periodic interval of time, the control section may disconnect the communication with the vehicle performed at the first periodic interval of time. Since, after the connection is established, the communication is maintained as long as the mobile terminal is located within a radio communication range, the communication can be carried out in a rapid manner when a change is made to the vehicle status or when the vehicle is operated via the mobile terminal. In addition, if it is determined that a change in the vehicle status and the vehicle operation via the mobile terminal are less likely to occur, the communication is automatically disconnected, thereby preventing wasted power consumption in periodic communication between the vehicle and the mobile terminal.

DESCRIPTION OF THE PREFERRED EMBODIMENTS

A vehicle communication system according to an embodiment of the present application will be described below with reference to the attached drawings.

Figure 1:
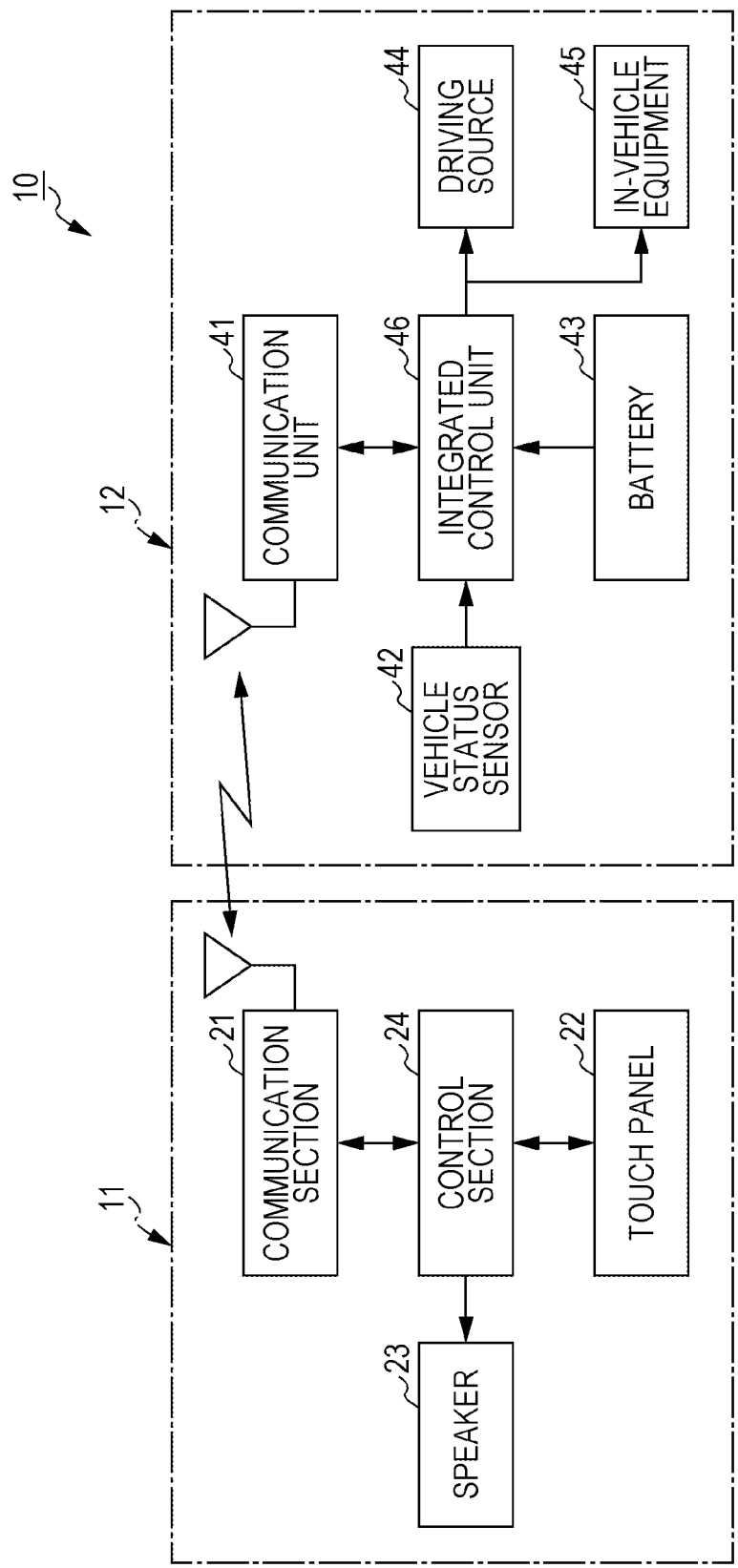
FIG. 1 is a block diagram of a vehicle communication system according to an embodiment of the present application.

The vehicle communication system 10 according to the embodiment includes a mobile terminal 11 and a vehicle 12, as shown in FIG. 1. The mobile terminal 11 is a remote control device carried by an occupant of the vehicle 12. The mobile terminal 11 performs mutual radio communication with the vehicle 12 through the use of, for example, Bluetooth (registered trademark) or other short-range radio communication.

The mobile terminal 11 is provided with a communication section 21, a touch panel 22, a speaker 23, and a control section 24. In response to a signal from the control section 24, the communication section 21 performs radio communication with a communication unit 41 of the vehicle 12 to be described later. The touch panel 22 displays a predetermined screen related to execution of a variety of programs (application programs and the like) stored in the control section 24. The touch panel 22 displays a status of the vehicle 12 or an operation screen for operating functions of the vehicle 12 from the outside. Upon receiving a touch operation that a user gives to the operation screen with his/her finger, the touch panel 22 outputs a command signal for giving an instruction for operation of the vehicle 12. In response to a signal from the control section 24, the speaker 23 reproduces a variety of pieces of voice or tone data stored in the control section 24. The speaker 23 generates, for example, an audible alarm that a driver carrying the mobile terminal 11 is able to recognize.

The control section 24 integrally controls operation of the mobile terminal 11. The control section 24 includes a CPU or other processor, a ROM that stores a program, and a RAM that temporarily stores data. The control section 24 also stores a variety of programs. The control section 24 stores an application program (hereinafter referred to as "predetermined program") that displays in a display screen the status of the vehicle 12 and the operation screen for operating the functions of the vehicle 12. The control section 24 stores a predetermined program that displays in the display screen an operation screen for operating door locking/unlocking of the vehicle 12, activation of a driving source 44 of the vehicle 12, and activation of an air conditioner of the vehicle 12 or other in-vehicle equipment 45.

In response to operation (for example, operation of an operation switch provided in the mobile terminal 11) of the mobile terminal 11 by the user, the control section 24 controls the activation/deactivation of a backlight provided in the display screen of the touch panel 22. When the backlight provided in the display screen of the touch panel 22 is illuminated, the control section 24 switches between display and non-display of the predetermined screen related to execution of a variety of programs during parallel execution of the programs.

Before a connection of radio communication with the vehicle 12 is established, the control section 24, when starting to execute a predetermined program in need of the establishment of the connection of radio communication with the vehicle 12, performs a scanning operation that enables an inquiry signal from the vehicle 12 to be received periodically in a predetermined intermittent period (at third periodic interval of time). The establishment of the connection of radio communication with the vehicle 12 is, for example, the establishment of a Piconet complying with the Bluetooth (registered trademark) communications standards. By responding to an inquiry signal received through the scanning operation, the control section 24 establishes the connection of radio communication through a process of authentication by the vehicle 12 or the like.

Before the connection of radio communication with the vehicle 12 is established, the control section 24, when not executing a predetermined program, suspends a scanning operation, as shown in Table. Before the connection of radio communication with the vehicle 12 is established, the control section 24 changes the third periodic interval of time according to display or non-display of the display screen of the touch panel 22 during a scanning operation that enables an inquiry signal from the vehicle 12 to be received periodically in a predetermined intermittent period (at third periodic interval of time). When the backlight provided in the display screen of the touch panel 22 is illuminated, the control section 24 performs a high-speed-mode scanning operation in a state where the predetermined screen is displayed in the display screen of the touch panel 22 in association with execution of the predetermined program. On the contrary, during execution of the predetermined program, the control section 24 performs a low-speed-mode scanning operation when the backlight in the display screen of the touch panel 22 is not illuminated or in a non-display state of the predetermined screen related to execution of the predetermined program associated with the illumination of the backlight. The control section 24 has the third periodic interval of time of, for example, several tens of milliseconds or so in the high-speed-mode scanning operation, while the control section 24 has the third periodic interval of time of, for example, several tens of seconds or so in the low-speed-mode scanning operation. The non-display state of the predetermined screen related to execution of the predetermined program associated with the illumination of the backlight is a state where a screen related to execution of an application program other than the predetermined program is displayed.

TABLE

| Predetermined program | Predetermined screen | Scanning operation |
|---|---|---|
| Being executed | Displayed | High-speed mode |
| Being executed | Not displayed | Low-speed mode |
| Not being executed | — | Not being performed |

After the connection of radio communication with the vehicle 12 is established, the control section 24 periodically performs mutual communication with the vehicle 12 in an intermittent period (at first periodic interval of time) according to control from the vehicle 12. The first periodic interval of time is, for example, one hundred milliseconds or so. Through the mutual communication with the vehicle 12, the control section (a terminal controller of the terminal device) 24 receives a signal containing the status information about the vehicle 12 on a periodic basis. When the communication section 21 receives a variety of signals sent from the vehicle 12 during the periodic mutual communication with the vehicle 12, the control section 24 controls display of the display screen in the touch panel 22 and operation of the speaker 23 in accordance with such signals. In addition, when an operation signal for operating the functions of the vehicle 12 is output from the touch panel 22 in response to a touch operation given by the user to the touch panel 22, the control section 24 sends such an operation signal through the communication section 21 during the periodic mutual communication with the vehicle 12.

After the connection of radio communication with the vehicle 12 is established, the control section 24 maintains the connection of the radio communication with the vehicle 12 while executing the predetermined program. Irrespective of the deactivation of the backlight in the display screen of the touch panel 22 or the non-display state of the predetermined screen related to execution of the predetermined program, the control section 24 maintains the connection of the radio communication with the vehicle 12 at the first periodic interval of time according to control from the vehicle 12. The control section 24 periodically receives a signal containing the status information about the vehicle 12 sent from the vehicle 12 and determines based on the status information about the vehicle 12 whether or not a predetermined alighting condition has been established. If it is determined that the predetermined alighting condition has been established, the control section 24 disconnects the communication with the vehicle 12 when a predetermined disconnection determination time has elapsed since the establishment of the alighting condition. The predetermined alighting condition is deemed to be established when the power source of the vehicle 12 is turned off or when an in-vehicle communication network that is mounted on the vehicle 12 and monitors the status of the vehicle 12 to send the status information about the vehicle 12 to the mobile terminal 11 goes into a predetermined power-saving mode.

While the connection of radio communication with the vehicle 12 is maintained, the control section 24 disconnects the radio communication with the vehicle 12 if the mobile terminal 11 moves out of a predetermined communication range established in the vicinity of the vehicle 12. In accordance with a reception intensity detected in the periodic mutual communication with the vehicle 12 at the first periodic interval of time, the control section 24 detects a location of the mobile terminal 11 relative to the predetermined communication range. The control section 24 determines that the mobile terminal 11 is located outside of the predetermined communication range if the reception intensity, for example, falls below a predetermined level.

The vehicle 12 is provided with a communication unit 41, a variety of vehicle status sensors 42, a battery 43, a driving source 44, a variety of pieces of in-vehicle equipment 45, and an integrated control unit 46. The communication unit 41, the vehicle status sensors 42, the battery 43, the driving source 44, and the pieces of in-vehicle equipment 45 are connected to the integrated control unit 46 so as to be able to perform mutual communication therebetween through the CAN communication network that is a general-purpose in-vehicle communication network. In response to a signal from the integrated control unit 46, the communication unit 41 performs radio communication with the communication section 21 of the mobile terminal 11.

The vehicle status sensors 42 are sensors that output a signal for a variety of statuses of the vehicle 12. The vehicle status sensors 42 include, for example, an ignition switch, a door lock status sensor, a door switch, a communication status sensor, a variety of switches of the in-vehicle equipment 45, and the like. The ignition switch outputs a signal indicating whether or not a driving source (for example, an internal combustion engine and an electric motor) of the vehicle 12 is running. The door lock status sensor outputs a signal indicating whether a door lock unit provided on the door of the vehicle 12 is locked or unlocked. The door switch outputs a signal indicating whether a door of the vehicle 12 is opened or closed. The communication status sensor outputs a signal indicating an operation mode (for example, sleep mode or wake mode) of the CAN communication or other in-vehicle communication network that is a general-purpose communication line. The switches of the pieces of in-vehicle equipment 45 output a signal indicating whether, for example, an air conditioner or other in-vehicle equipment 45 is operating or not.

The battery 43 supplies electric power in the vehicle 12. The driving source 44 is, for example, an internal combustion engine and an electric motor. The pieces of in-vehicle equipment 45 include a door lock unit, an air conditioner, a display unit, a speaker and the like.

The integrated control unit 46 integrally controls the vehicle 12. The integrated control unit 46 is provided with a CPU or other processor, a ROM that stores a program, and a RAM that temporarily stores data. Before the connection of radio communication with the mobile terminal 11 is established, the integrated control unit 46 sends an inquiry signal to establish the connection to the vicinity of the vehicle 12 in a predetermined intermittent period (second periodic interval of time) when the communication unit 41 is in the sleep mode. Before the connection of radio communication with the mobile terminal 11 is established, the integrated control unit 46, when the communication unit 41 is in the wake mode, sends an inquiry signal to establish the connection to the vicinity of the vehicle 12 in a predetermined intermittent period (fourth intermittent period) shorter than that when the communication unit 41 is in the sleep mode. The second periodic interval of time and the fourth intermittent period are, for example, several tens of milliseconds or so and different from the third periodic interval of time associated with the scanning operation of the mobile terminal 11.

The sleep mode of the communication unit 41 is a predetermined power-saving mode. Such a predetermined power-saving mode is a mode in which the communication unit 41 and the in-vehicle communication network have part of their functions deactivated or infrequently performed. When the communication unit 41 is in the sleep mode, the integrated control unit 46 sends an inquiry signal to establish the connection at the second periodic interval of time longer than that in the wake mode, while maintaining monitoring of a variety of statuses of the vehicle 12 by the vehicle status sensors 42. The wake mode of the communication unit 41 is a normal operating mode. The normal operating mode is a mode in which the communication unit 41 and the in-vehicle communication network have all of their functions activated with no restriction. When the communication unit 41 is in the wake mode, the integrated control unit 46 sends an inquiry signal to establish the connection in the fourth intermittent period shorter than that in the sleep mode, while maintaining monitoring of various statuses of the vehicle 12 by the vehicle status sensors 42.

Upon receiving a response from the mobile terminal 11 to the inquiry signal sent to the vicinity of the vehicle 12 in the second or fourth intermittent period, the integrated control unit 46 establishes the connection of radio communication with the mobile terminal 11 through authentication or other processing. After establishing the connection of radio communication with the mobile terminal 11, the integrated control unit 46 performs mutual communication with the mobile terminal 11 at the first periodic interval of time. Through the mutual communication with the mobile terminal 11, the integrated control unit 46 periodically sends a signal containing status information about the vehicle 12. Pieces of the status information about the vehicle 12 include on and off of the ignition switch, locking and unlocking of the door lock unit, opening and closing of the door, the sleep and wake modes of the communication unit 41, the power-saving and normal operating modes of the in-vehicle communication network, on and off of the power source, and the like. Also, the pieces of the status information about the vehicle 12 include information about the establishment of the predetermined alighting condition. The predetermined alighting condition is deemed to be established, for example, when a predetermined time has elapsed since the ignition switch is turned off and the driver's side door is opened, when the vehicle 12 is powered off, or when the in-vehicle communication network of the vehicle 12 goes into a predetermined power-saving mode.

The vehicle communication system 10 according to the embodiment is configured as described above and will now be described below in terms of operation.

A first example of operation of the vehicle communication system 10 is described below with reference to FIG. 2. In the first example of operation, the mobile terminal 11 moves into a radio communication range around the vehicle 12 from the outside while executing a predetermined program. The mobile terminal 11 enters the radio communication range with a predetermined screen related to execution of the predetermined program displayed in a display screen of the touch panel 22.

Figure 2:
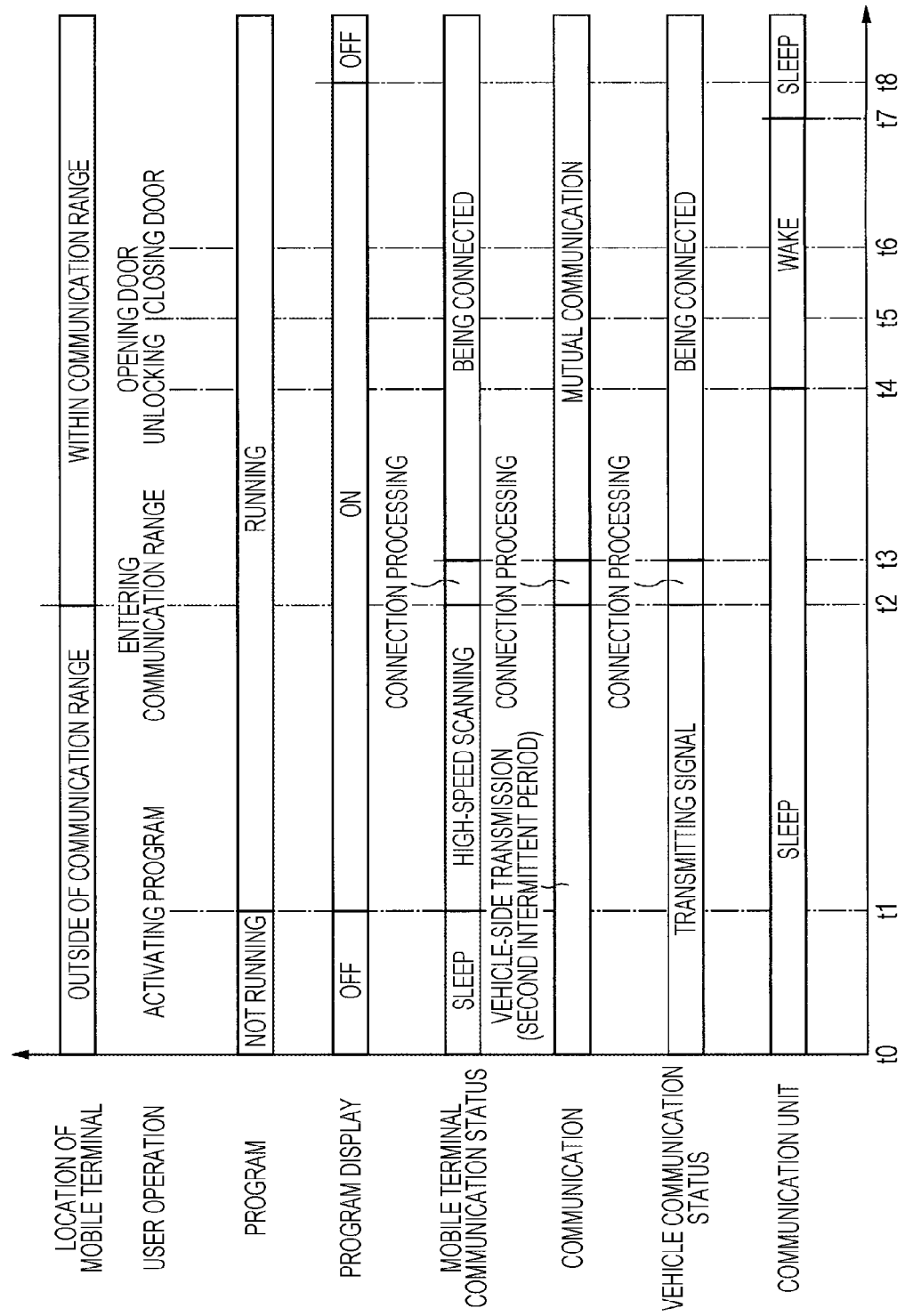
FIG. 2 is a diagram showing a location of a vehicle communication system, operation of a mobile terminal or a vehicle by a user, an operating status of a predetermined application program (predetermined program) in a mobile terminal, a display of a predetermined screen related to execution of a predetermined program in a mobile terminal, a communication status of a mobile terminal, a status of communication between a mobile terminal and a vehicle, a vehicle communication status, and a typical change in operating status of a vehicle communication unit according to an embodiment of the present application.

During the period from t0 to t1 shown in FIG. 2, the mobile terminal 11 is located outside of a predetermined radio communication range established in the vicinity of the vehicle 12. The control section 24 of the mobile terminal 11 is suspending execution of a predetermined program. The control section 24 has the predetermined screen related to execution of the predetermined program not displayed (OFF) in the display screen of the touch panel 22. The control section 24 puts the mobile terminal 11 in the sleep mode of communication and suspends the performance of a scanning operation that enables an inquiry signal sent from the vehicle 12 to be received at the third periodic interval of time. The integrated control unit 46 of the vehicle 12 has the communication unit 41 and the in-vehicle communication network put in the sleep mode that is a predetermined power-saving mode. With the communication unit 41 in the sleep mode, the integrated control unit 46 sends to the vicinity of the vehicle 12 an inquiry signal for establishing the connection at the second periodic interval of time longer than that in the wake mode. With this arrangement, a mode of communication between the mobile terminal 11 and the vehicle 12 switches to a mode in which an inquiry signal is transmitted from the vehicle 12 at the second periodic interval of time (vehicle-side transmission).

At time t1 when the user gives an instruction to execute the predetermined program via the mobile terminal 11, the control section 24 starts up the predetermined program. The control section 24 puts the predetermined screen related to execution of the predetermined program in a display mode (ON) in the display screen of the touch panel 22. The control section 24 performs a high-speed-mode scanning operation that enables an inquiry signal sent from the vehicle 12 to be received at the third periodic interval of time shorter than that in the low-speed mode.

At time t2 when the mobile terminal 11 enters a predetermined radio communication range established around the vehicle 12 from the outside, the control section 24 and the integrated control unit 46 become ready to execute predetermined connection processing. At this time, due to a scanning operation performed by the mobile terminal 11 in the high-speed mode, the scanning operation of the mobile terminal 11 and the transmission of an inquiry signal from the vehicle 12 are more likely to be synchronized with each other, as compared with a scanning operation in the low-speed mode. In conjunction with the synchronization between a scanning operation and the inquiry signal, the control section 24 and the integrated control unit 46 perform the predetermined connection processing. Upon receiving the inquiry signal from the vehicle 12 through the scanning operation, the control section 24 responds to the inquiry signal. Upon receiving a response to the inquiry signal from the mobile terminal 11, the integrated control unit 46 establishes connection of radio communication with the mobile terminal 11 through authentication or other processing. Then, at time t3 when the connection of radio communication with the vehicle 12 has been completed, the control section 24 suspends execution of the scanning operation in the high-speed mode. The integrated control unit 46, when the connection of radio communication with the mobile terminal 11 has been established, suspends the transmission of the inquiry signal while maintaining the communication unit 41 in the sleep mode. The control section 24 and the integrated control unit 46 communicate with each other at the first periodic interval of time according to control from the vehicle 12, thereby maintaining the connection of radio communication. With this arrangement, a mode of communication between the mobile terminal 11 and the vehicle 12 switches to a mode of mutual communication.

At time t4 when the user instructs the vehicle 12 to unlock the door lock unit via the mobile terminal 11, the control section 24 transmits an unlock request signal in the mutual communication with the vehicle 12 at the first periodic interval of time. Upon receiving the unlock request signal from the vehicle 12, the integrated control unit 46 unlocks the door lock unit. When the vehicle status sensors 42 output a signal indicating that the status of the door lock unit has been changed from a locked status to an unlocked status, the integrated control unit 46 switches the communication unit 41 from the sleep mode to the wake mode. The integrated control unit 46 transmits signals for the status information of the vehicle 12, including a signal for the unlocked status of the door lock unit, in the mutual communication with the mobile terminal 11 at the first periodic interval of time.

At t4 to t5 before a predetermined time elapses, when the user changes the status of the door (for example, driver's side door) of the vehicle 12 from a closed status to an open status, the vehicle status sensors 42 output a signal indicating that the status of the door has been changed from the closed status to the open status. While maintaining the communication unit 41 in the wake mode, the integrated control unit 46 transmits signals for the status information of the vehicle 12, including a door open signal, in the mutual communication with the mobile terminal 11 at the first periodic interval of time.

At t5 to t6 before a predetermined time elapses, when the user changes the status of the door (for example, driver's side door) of the vehicle 12 from the open status to the closed status, the vehicle status sensors 42 output a signal indicating that the status of the door has been changed from the open status to the closed status. While maintaining the communication unit 41 in the wake mode, the integrated control unit 46 transmits signals for the status information of the vehicle 12, including a door closed signal, in the mutual communication with the mobile terminal 11 at the first periodic interval of time.

During the time period from t6 to t7 after a predetermined time has elapsed, during which there is no change in signals for the status information of the vehicle 12 output from the vehicle status sensors 42, the integrated control unit 46 switches the communication unit 41 from the wake mode to the sleep mode at t7. At this time, the integrated control unit 46 maintains the connection of radio communication with the mobile terminal 11.

At t8, even when the predetermined screen related to execution of the predetermined program goes into a non-display state, the control section 24 and the integrated control unit 46 maintain the connection of radio communication between the mobile terminal 11 and the vehicle 12 at the first periodic interval of time if the execution of the predetermined program is maintained.

A second example of operation of the vehicle communication system 10 is described below with reference to FIG. 3. In the second example of operation, the mobile terminal 11 moves into a radio communication range around the vehicle 12 from the outside while executing a predetermined program. The mobile terminal 11 enters the radio communication range with a predetermined screen related to execution of the predetermined program not displayed in the display screen of the touch panel 22.

Figure 3:
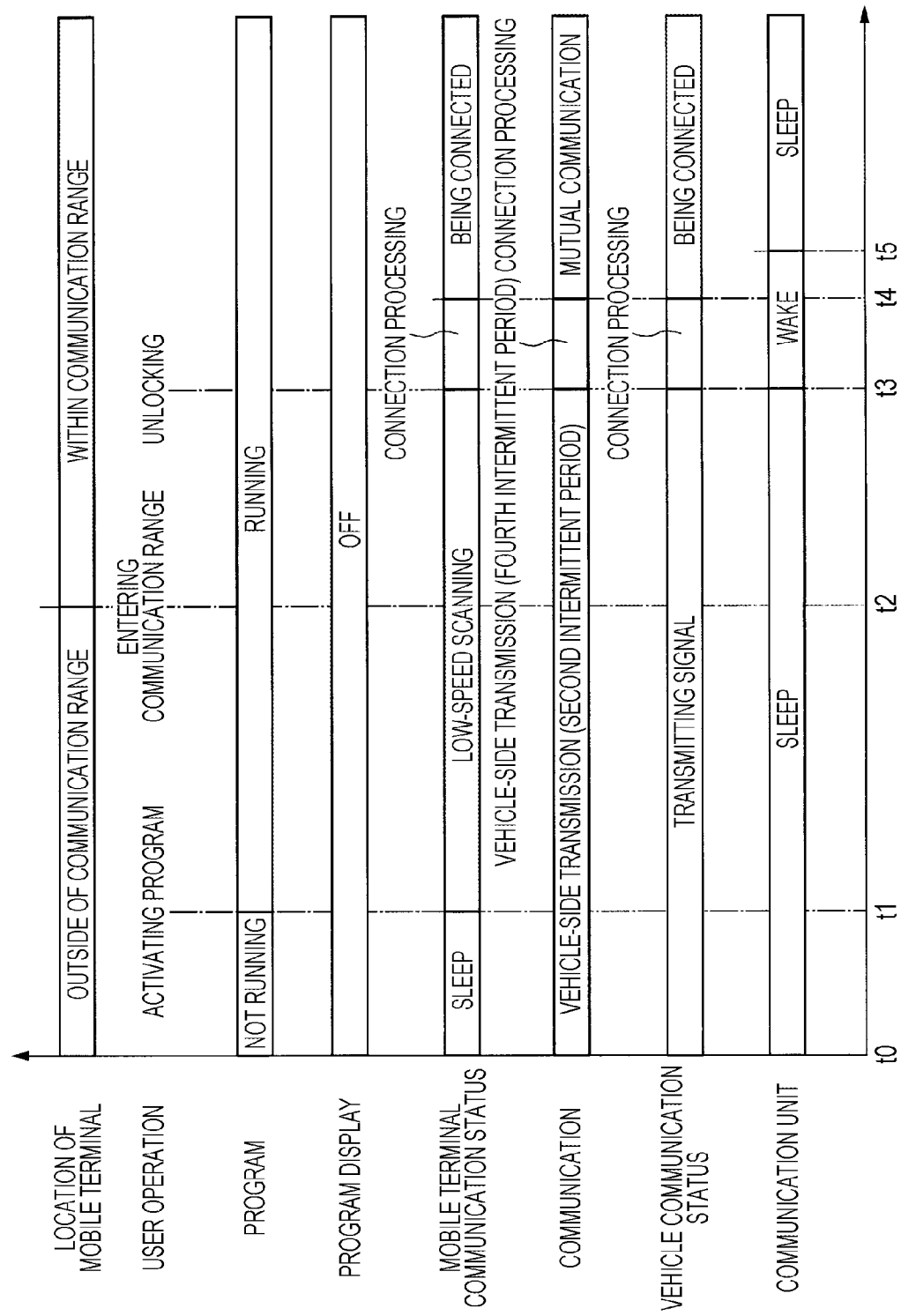
FIG. 3 is a diagram showing a location of a vehicle communication system, operation of a mobile terminal or a vehicle by a user, an operating status of a predetermined application program (predetermined program) in a mobile terminal, a display of a predetermined screen related to execution of a predetermined program in a mobile terminal, a communication status of a mobile terminal, a status of communication between a mobile terminal and a vehicle, a vehicle communication status, and a typical change in operating status of a vehicle communication unit according to an embodiment of the present application.

At time from t0 to t1 shown in FIG. 3, the mobile terminal 11 is located outside of a predetermined radio communication range established in the vicinity of the vehicle 12. The control section 24 of the mobile terminal 11 is suspending execution of a predetermined program. The control section 24 has the predetermined screen related to execution of the predetermined program not displayed (OFF) in the display screen of the touch panel 22. The control section 24 puts the mobile terminal 11 in the sleep mode of communication and suspends the performance of scanning operation that enables an inquiry signal sent from the vehicle 12 to be received at the third periodic interval of time. The integrated control unit 46 of the vehicle 12 has the communication unit 41 and the in-vehicle communication network put in the sleep mode that is a predetermined power-saving mode. With the communication unit 41 put in the sleep mode, the integrated control unit 46 sends to the vicinity of the vehicle 12 an inquiry signal for establishing the connection at the second periodic interval of time longer than that in the wake mode. With this arrangement, a mode of communication between the mobile terminal 11 and the vehicle 12 turns to a mode in which an inquiry signal is transmitted from the vehicle 12 at the second periodic interval of time (vehicle-side transmission).

At time t1 when the user gives an instruction to execute the predetermined program via the mobile terminal 11, the control section 24 starts up the predetermined program. The control section 24 keeps the predetermined screen related to execution of the predetermined program in a non-display mode (OFF) in the display screen of the touch panel 22. The control section 24 performs a low-speed-mode scanning operation that enables an inquiry signal sent from the vehicle 12 to be received at the third periodic interval of time longer than that in the high-speed mode.

At time t2 when the mobile terminal 11 enters a predetermined radio communication range established around the vehicle 12 from the outside, the control section 24 and the integrated control unit 46 become ready to execute a predetermined connection processing. At this time, due to a scanning operation performed by the mobile terminal 11 in the low-speed mode, the scanning operation of the mobile terminal 11 and the transmission of an inquiry signal from the vehicle 12 are less likely to be synchronized with each other, as compared with the scanning operation in the high-speed mode. The control section 24 and the integrated control unit 46 withhold execution of a predetermined connection processing until the synchronization of the scanning operation and the inquiry signal is obtained.

At time t3 when the user instructs the vehicle 12 to unlock the door lock unit via an electronic key that is used independently of the mobile terminal 11, the integrated control unit 46 unlocks the door lock unit upon receiving an unlock request signal. Even if the user uses a mechanical key to directly unlock the door lock unit, the door lock unit of the vehicle 12 is unlocked. When the vehicle status sensors 42 output a signal indicating that the status of the door lock unit is changed from a locked status to an unlocked status, the integrated control unit 46 switches the communication unit 41 from the sleep mode to the wake mode. With the communication unit 41 in the wake mode, the integrated control unit 46 sends an inquiry signal to establish the connection to the vicinity of the vehicle 12 in a fourth intermittent period shorter than that in the sleep mode. With this arrangement, a mode of communication between the mobile terminal 11 and the vehicle 12 turns to a mode in which an inquiry signal is transmitted from the vehicle 12 in the fourth intermittent period (vehicle-side transmission).

At this time, since a period of transmission of an inquiry signal from the vehicle 12 is shorter than that in the sleep mode, the scanning operation of the mobile terminal 11 and the transmission of an inquiry signal from the vehicle 12 are more likely to be synchronized with each other than in the sleep mode. In conjunction with the synchronization between the scanning operation and the inquiry signal, the control section 24 and the integrated control unit 46 perform the predetermined connection processing. Upon receiving the inquiry signal from the vehicle 12 through the scanning operation, the control section 24 responds to the inquiry signal. Upon receiving a response to the inquiry signal from the mobile terminal 11, the integrated control unit 46 establishes connection of radio communication with the mobile terminal 11 through authentication or other processing.

At t3 to t4 before a predetermined time elapses, when the connection of radio communication with the vehicle 12 has been established, the control section 24 suspends execution of the scanning operation in the low-speed mode. The integrated control unit 46, when the connection of radio communication with the mobile terminal 11 has been established, suspends the transmission of the inquiry signal while maintaining the communication unit 41 in the wake mode. The control section 24 and the integrated control unit 46 communicate with each other at the first periodic interval of time according to control from the vehicle 12, thereby maintaining the connection of radio communication. With this arrangement, a mode of communication between the mobile terminal 11 and the vehicle 12 turns to a mode of mutual communication.

At from t3 to t5 after a predetermined time elapses, during which there is no change in signals for status information of the vehicle 12 output from the vehicle status sensors 42, the integrated control unit 46 switches the communication unit 41 from the wake mode to the sleep mode at t5. At this time, the integrated control unit 46 maintains the connection of radio communication with the mobile terminal 11.

A third example of operation of the vehicle communication system 10 is described below with reference to FIG. 4. In the third example of operation, after the user gets out of the vehicle 12, the mobile terminal 11 remains within a radio communication range (for example, in a building) around the vehicle 12 while maintaining radio communication with the vehicle 12. The mobile terminal 11 is executing a predetermined program with a predetermined screen related to execution of the predetermined program not displayed in the display screen of the touch panel 22.

Figure 4:
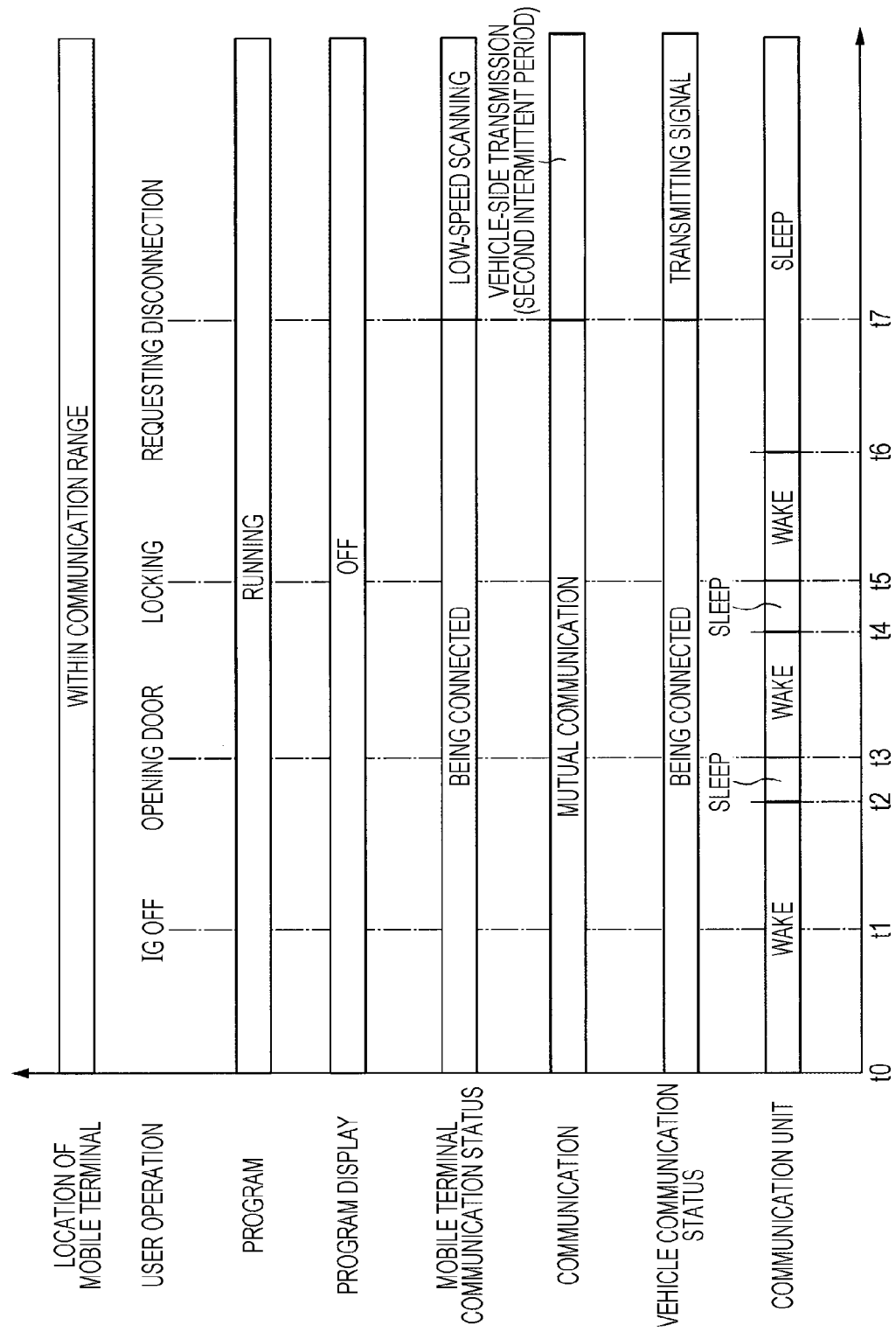
FIG. 4 is a diagram showing a location of a vehicle communication system, operation of a mobile terminal or a vehicle by a user, an operating status of a predetermined application program (predetermined program) in a mobile terminal, a display of a predetermined screen related to execution of a predetermined program in a mobile terminal, a communication status of a mobile terminal, a status of communication between a mobile terminal and a vehicle, a vehicle communication status, and a typical change in operating status of a vehicle communication unit according to an embodiment of the present application.

At time from t0 to t1 shown in FIG. 4, the mobile terminal 11 is located within a predetermined radio communication range established in the vicinity of the vehicle 12. While executing a predetermined program, the control section 24 of the mobile terminal 11 has the predetermined screen related to execution of the predetermined program not displayed (OFF) in the display screen of the touch panel 22. The integrated control unit 46 of the vehicle 12 has the communication unit 41 put in the wake mode. The control section 24 and the integrated control unit 46 mutually communicate with each other at the first periodic interval of time according to control from the vehicle 12, thereby maintaining the connection of radio communication. With this arrangement, a mode of communication between the mobile terminal 11 and the vehicle 12 is a mode of mutual communication.

At time t1 when the user instructs the vehicle 12 to turn off the ignition (IG OFF) via the ignition switch, the integrated control unit 46 shuts down the driving source 44 and powers off the air conditioner or other in-vehicle equipment 45. While keeping the communication unit 41 in the wake mode, the integrated control unit 46 sends signals for the status information of the vehicle 12, including an ignition-off signal, in the mutual communication with the mobile terminal 11 at the first periodic interval of time.

At from t1 to t2 after a predetermined time elapses, during which there is no change in signals for the status information of the vehicle 12 output from the vehicle status sensors 42, the integrated control unit 46 switches the communication unit 41 from the wake mode to the sleep mode at t2. At this time, the integrated control unit 46 maintains the connection of radio communication with the mobile terminal 11.

At time t3 when the user changes the status of the door (for example, driver's side door) of the vehicle 12 from a closed status to an open status, the vehicle status sensors 42 output a signal indicating that the status of the door has been changed from the closed status to the open status. Upon receiving a signal from the vehicle status sensors 42, the integrated control unit 46 switches the communication unit 41 from the sleep mode to the wake mode. The integrated control unit 46 transmits signals for the status information of the vehicle 12, including a door open signal, in the mutual communication with the mobile terminal 11 at the first periodic interval of time.

At from t3 to t4 after a predetermined time elapses, during which there is no change in signals for status information of the vehicle 12 output from the vehicle status sensors 42, the integrated control unit 46 switches the communication unit 41 from the wake mode to the sleep mode at t4. At this time, the integrated control unit 46 maintains the connection of radio communication with the mobile terminal 11.

At time t5 when the user instructs the vehicle 12 to lock the door lock unit via an electronic key that is used independently of the mobile terminal 11, the integrated control unit 46 locks the door lock unit upon receiving a lock request signal. Even if the user uses a mechanical key to directly lock the door lock unit, the door lock unit of the vehicle 12 is locked. When the vehicle status sensors 42 output a signal indicating that the status of the door lock unit is changed from an unlocked status to a locked status, the integrated control unit 46 switches the communication unit 41 from the sleep mode to the wake mode. The integrated control unit 46 transmits signals for the status information of the vehicle 12, including a signal for the locked status of the door lock unit, in the mutual communication with the mobile terminal 11 at the first periodic interval of time.

At from t5 to t6 after a predetermined time elapses, during which there is no change in signals for the status information of the vehicle 12 output from the vehicle status sensors 42, the integrated control unit 46 switches the communication unit 41 from the wake mode to the sleep mode at t4. At this time, the integrated control unit 46 maintains the connection of radio communication with the mobile terminal 11.

At from t3 to t7 after a predetermined disconnection determination time elapses, the control section 24 outputs a signal to make a request for disconnection of the radio communication in mutual communication with the vehicle 12 at the first periodic interval of time. While maintaining the execution of the predetermined program and a non-display of the predetermined screen, the control section 24 begins to execute a low-speed-mode scanning operation that enables an inquiry signal sent from the vehicle 12 to be received at the third periodic interval of time longer than that in the high-speed mode. Upon receiving a disconnection request signal from the mobile terminal 11, the integrated control unit 46 disconnects the radio communication with the mobile terminal 11. With the communication unit 41 in the sleep mode, the integrated control unit 46 sends to the vicinity of the vehicle 12 an inquiry signal for establishing the connection at the second periodic interval of time longer than that in the wake mode. With this arrangement, a mode of communication between the mobile terminal 11 and the vehicle 12 turns to a mode in which an inquiry signal is transmitted from the vehicle 12 at the second periodic interval of time (vehicle-side transmission).

As described above, in the vehicle communication system 10 according to the embodiment, a scanning period of the mobile terminal 11, before the connection of radio communication is established, is set to the high-speed mode if the user is determined to be likely to view the display screen of the mobile terminal 11. With this arrangement, the connection of radio communication can be established in a short time even if an inquiry signal is received intermittently, while wasted electric consumption of the mobile terminal 11 is reduced. In addition, since the scanning period is set according to whether or not the predetermined program related to the vehicle 12 is activated, the scanning period can be set to the high-speed mode on a more timely basis, except the case where the display of the display screen is on for other purposes.

Furthermore, since the scanning period is set according to whether or not the backlight in the display screen of the mobile terminal 11 is activated, the scanning period can be changed sooner, thereby enabling the connection of radio communication with the vehicle 12 to be established sooner. In addition, with the predetermined screen related to execution of the predetermined programs being not displayed, the scanning operation is performed in the low-speed mode even if the connection is less likely to immediately become necessary, thereby enabling the connection to be established while wasted electric consumption of the mobile terminal 11 is reduced.

If it is determined from the fact of the predetermined program being not performed that the mobile terminal 11 obviously has no intention to communicate with the vehicle 12, the scanning operation is suspended, thereby preventing wasted electric consumption of the mobile terminal 11. In addition, even if the transmission of an inquiry signal and the scanning operation are synchronized with each other between the mobile terminal 11 and the vehicle 12, the connection of radio communication can be automatically established when the second periodic interval of time and the third periodic interval of time coincide with each other in timing.

Furthermore, the establishment of the Piconet complying with the Bluetooth (registered trademark) communications standards achieves reduced electric power consumption as well as quicker establishment of the connection of the mobile terminal 11 in an effective manner in a highly general-purpose communication system having a parent-child relationship in communication. In addition, since, after the connection is established, communication is maintained as long as the mobile terminal 11 is located within a radio communication range, the communication can be carried out in a rapid manner when a change is made to the vehicle status or when the vehicle 12 is operated via the mobile terminal 11. If it is determined that a change in the vehicle status and the vehicle operation via the mobile terminal 11 are less likely to occur, the communication is automatically disconnected, thereby preventing wasted power consumption in periodic communication between the vehicle 12 and the mobile terminal 11. In addition, since the radio communication is disconnected after a predetermined disconnection determination time has elapsed since the establishment of an alighting condition to make a determination of communication disconnection, the vehicle 12 is monitored for half-shut door or other abnormal state in the vehicle 12 until the disconnection determination time elapses, whereby a signal indicating the occurrence of an abnormal state could be immediately sent to the mobile terminal 11. Furthermore, since the vehicle 12 being put in a power-off state and the in-vehicle communication network being put in a predetermined power-saving mode are used as the alighting condition for determining communication disconnection, the necessity for maintaining the connection of communication between the vehicle 12 and the mobile terminal 11 can be determined in a proper fashion.

A modification to the embodiment will be described below. In the third example of operation of the above-described embodiment, the integrated control unit 46 receives a disconnect request from the mobile terminal 11, but not limited to this. When acquiring information about the establishment of a predetermined alighting condition from a variety of the vehicle status sensors 42, the integrated control unit 46 may transmit the disconnect request to the mobile terminal 11 in mutual communication with the mobile terminal 11 at the first periodic interval of time. When, during radio communication being connected with the vehicle 12, receiving the disconnect request (namely, a request for disconnection of periodic mutual communication with the vehicle 12 at the first periodic interval of time) sent from the vehicle 12, the control section 24 of the mobile terminal 11 disconnects the connection of radio communication with the vehicle 12.

In the third example of operation of the above-described embodiment, the control section 24 or the integrated control unit 46 may determine whether or not a series of user operations used to determine the establishment of a predetermined alighting condition are performed within a predetermined time interval. The control section 24 or the integrated control unit 46 determines that alighting operation is proper if, for example, ignition-off (IG OFF), door opening, and other user's successive operations are performed within a predetermined time interval. On the contrary, if user's successive operations are not performed within a predetermined time interval, the control section 24 or the integrated control unit 46 determines that normal alighting operations are not performed, withholding the establishment of a predetermined alighting condition.

In the embodiment described above, the mobile terminal 11 is provided with the touch panel 22, but not limited to this. An operating switch and a display unit may be provided in place of the touch panel 22.

The present application is typically described with reference to, but not limited to, the foregoing embodiments. Various omissions, replacements, or modifications are conceivable within the scope of the present application. Such embodiments and their modifications are included in the scope and the subject-matter of the present application and in the literal and equivalent scope of the claims below.

What is claimed is:

1. A vehicle communication system comprising:
   a mobile terminal having a display screen and a terminal controller and configured to perform an ON/OFF operation of the display screen through the terminal controller or by a user of the mobile terminal;
   a vehicle having an in-vehicle controller that periodically performs a telecommunication with the mobile terminal at a first periodic interval of time when a connection with the mobile terminal is established, the in-vehicle controller being configured to periodically send an inquiry signal for establishing the connection to a vicinity of the vehicle at a second periodic interval of time when the connection with the mobile terminal is not established; and
   a door lock status sensor configured to detect that a status of a door of the vehicle is changed from a locked status to an unlocked status,
   wherein the terminal controller of the mobile terminal performs a scanning operation that searches for the inquiry signal from the vehicle for establishing the connection, the scanning operation being periodically performed at a third periodic interval of time when the connection with the mobile terminal is not established;
   wherein the terminal controller of the mobile terminal is configured to switch the third periodic interval of time between at least two periods comprising a first period and a second period shorter than the first period, the terminal controller being configured to set the third periodic interval of time to be the second period when the terminal controller determines that the display screen of the mobile terminal is ON; and
   wherein the in-vehicle controller periodically sends the inquiry signal for establishing the connection to the vicinity of the vehicle at a fourth periodic interval of time when the door lock status sensor detects that the status of the door is changed from the locked status to the unlocked status, the fourth periodic interval of time being shorter than the second periodic interval of time.

2. The vehicle communication system according to claim 1,
   wherein the mobile terminal has a program stored therein that performs a display operation of the display screen for displaying vehicle-related information related to a status of the vehicle or a function of the vehicle,
   wherein the terminal controller of the mobile terminal determines that the display screen is ON when the vehicle-related information is displayed in the display screen, and determines that the display screen is OFF when the vehicle-related information is not displayed in the display screen, and
   wherein the terminal controller of the mobile terminal sets the third periodic interval of time to be the second period when the vehicle-related information is displayed in the display screen.

3. The vehicle communication system according to claim 1,
   wherein the mobile terminal further comprises a backlight which can be activated to illuminate the display screen, and
   wherein the terminal controller of the mobile terminal determines that the display screen is ON when the backlight is activated, and determines that the display screen is OFF when the backlight is not activated.

4. The vehicle communication system according to claim 2, wherein the terminal controller of the mobile terminal sets the third periodic interval of time to be the first period when-the terminal controller is running the program, but the display screen is not displaying the vehicle-related information.

5. The vehicle communication system according to claim 2, wherein the terminal controller of the mobile terminal suspends the scanning operation when the terminal controller is running the program.

6. The vehicle communication system according to claim 1, wherein the second periodic interval of time and the third periodic interval of time are different periods of time from each other.

7. The vehicle communication system according to claim 6, wherein the establishing of the connection is an establishing of a Piconet complying with Bluetooth (registered trademark) communication standards.

8. The vehicle communication system according to claim 1, wherein, after the connection has been established, the terminal controller of the mobile terminal is configured to: (i) maintain the telecommunication between the vehicle and the mobile terminal at the first periodic interval of time regardless of the ON/OFF determination for the display screen; (ii) periodically receive a signal containing information of a status of the vehicle during the telecommunication; (iii) based on information of the status of the vehicle, determine whether or not a predetermined alighting condition under which the vehicle is deemed not to be in operation is met; and (iv) disconnect the telecommunication with the vehicle when a predetermined time has elapsed after the alighting condition is met.

9. The vehicle communication system according to claim 8, wherein the vehicle further comprises an in-vehicle communication network mounted thereon and configured to send information of the status of the vehicle to the mobile terminal while monitoring the information, and wherein the terminal controller of the mobile terminal determiners that the predetermined alighting condition is met when the vehicle is powered off or when the in-vehicle communication network is in a predetermined power-saving mode.

10. The vehicle communication system according to claim 1, wherein the vehicle further comprises an in-vehicle communication network mounted with the in-vehicle controller and configured to send information related to a status of the vehicle to the mobile terminal while monitoring the information, wherein the in-vehicle controller sends to the mobile terminal (a) the information related to the status of the vehicle which comprises information indicating that the in-vehicle communication network is in a predetermined power-saving mode; and (b) a request for disconnecting the telecommunication performed at the first periodic interval of time, and wherein, after the connection has been established, the terminal controller of the mobile terminal is configured to: (i) maintain the telecommunication between the vehicle and the mobile terminal at the first periodic interval of time regardless of the ON/OFF determination for the display screen; and (ii) disconnect the telecommunication with the vehicle performed at the first periodic interval of time upon receiving the information indicating that the in-vehicle communication network is in the predetermined power-saving mode or the request for disconnecting the telecommunication performed at the first periodic interval of time.

11. A vehicle communication system comprising:
a mobile terminal having a display screen and a terminal controller and configured to perform an ON/OFF operation of the display screen through the terminal controller or by a user of the mobile terminal; and
a vehicle having an in-vehicle controller that periodically performs a telecommunication with the mobile terminal at a first periodic interval of time when a connection with the mobile terminal is established, the in-vehicle controller being configured to periodically send an inquiry signal for establishing the connection to a vicinity of the vehicle at a second periodic interval of time when the connection with the mobile terminal is not established,
wherein the terminal controller of the mobile terminal performs a scanning operation that searches for the inquiry signal from the vehicle for establishing the connection, the scanning operation being periodically performed at a third periodic interval of time when the connection with the mobile terminal is not established,
wherein the terminal controller of the mobile terminal is configured to switch the third periodic interval of time between a low speed mode in which the third periodic interval of time is a first period and a high speed mode in which the third periodic interval of time is a second period shorter than the first period, the terminal controller being configured to set the high speed mode when the terminal controller determines that the display screen of the mobile terminal is ON,
wherein the mobile terminal further has a memory which has different programs stored therein which comprise a program that performs a display operation of the display screen for displaying vehicle-related information related to a status of the vehicle or a function of the vehicle,
wherein the terminal controller of the mobile terminal determines that the display screen is ON when the vehicle-related information is displayed in the display screen, and determines that the display screen is OFF when the vehicle-related information is not displayed in the display screen,
wherein the terminal controller of the mobile terminal sets the third periodic interval of time to be the high speed mode that performs the scanning operation with the second period when the vehicle-related information is displayed in the display screen which is performed by the program for displaying the vehicle-related information, and
wherein the terminal controller of the mobile terminal sets the third periodic interval of time to be the low speed mode that performs the scanning operation with the first period when the vehicle-related information is not displayed in the display screen, while the program for displaying the vehicle-related information is run.

12. The vehicle communication system according to claim 11, wherein the terminal controller of the mobile terminal suspends the scanning operation when the terminal controller is running the program for displaying the vehicle-related information.

13. The vehicle communication system according to claim 11,
wherein the second periodic interval of time and the third periodic interval of time are different periods of time from each other.

14. The vehicle communication system according to claim 13,
wherein the establishing of the connection is an establishing of a Piconet complying with Bluetooth (registered trademark) communication standards.

15. The vehicle communication system according to claim 11,
wherein, after the connection has been established, the terminal controller of the mobile terminal is configured to: (i) maintain the telecommunication between the vehicle and the mobile terminal at the first periodic interval of time regardless of the ON/OFF determination for the display screen; (ii) periodically receive a signal containing information of a status of the vehicle during the telecommunication; (iii) based on information of the status of the vehicle, determine whether or not a predetermined alighting condition under which the vehicle is deemed not to be in operation is met; and (iv) disconnect the telecommunication with the vehicle when a predetermined time has elapsed after the alighting condition is met.

16. The vehicle communication system according to claim 15,
wherein the vehicle further comprises an in-vehicle communication network mounted thereon and configured to send information of the status of the vehicle to the mobile terminal while monitoring the information, and
wherein the terminal controller of the mobile terminal determiners that the predetermined alighting condition is met when the vehicle is powered off or when the in-vehicle communication network is in a predetermined power-saving mode.

17. The vehicle communication system according to claim 11,
wherein the vehicle further comprises an in-vehicle communication network mounted with the in-vehicle controller and configured to send information related to a status of the vehicle to the mobile terminal while monitoring the information,
wherein the in-vehicle controller sends to the mobile terminal (a) the information related to the status of the vehicle which comprises information indicating that the in-vehicle communication network is in a predetermined power-saving mode; and (b) a request for disconnecting the telecommunication performed at the first periodic interval of time, and
wherein, after the connection has been established, the terminal controller of the mobile terminal is configured to: (i) maintain the telecommunication between the vehicle and the mobile terminal at the first periodic interval of time regardless of the ON/OFF determination for the display screen; and (ii) disconnect the telecommunication with the vehicle performed at the first periodic interval of time upon receiving the information indicating that the in-vehicle communication network is in the predetermined power-saving mode or the request for disconnecting the telecommunication performed at the first periodic interval of time.

* * * * *